(12) United States Patent
Mears et al.

(10) Patent No.: US 8,336,682 B2
(45) Date of Patent: Dec. 25, 2012

(54) VENTILATED BRAKE DISK AND METHOD

(75) Inventors: Joseph Aaron Mears, Zanesfield, OH (US); Hiroki Ishikawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 847 days.

(21) Appl. No.: 11/849,183

(22) Filed: Aug. 31, 2007

(65) Prior Publication Data

US 2009/0057077 A1    Mar. 5, 2009

(51) Int. Cl.
*F16D 65/12*        (2006.01)
(52) U.S. Cl. ................................. 188/218 XL
(58) Field of Classification Search ............ 188/218 XL, 188/18 A
See application file for complete search history.

(56) References Cited

U.S. PATENT DOCUMENTS

| | | | |
|---|---|---|---|
| 3,892,297 A | | 7/1975 | Brownyer |
| 4,488,074 A | | 12/1984 | Marandet |
| 4,712,656 A | * | 12/1987 | Courtois ................. 188/218 XL |
| 5,139,117 A | * | 8/1992 | Melinat .................... 188/218 XL |
| 5,427,212 A | * | 6/1995 | Shimazu et al. ......... 188/218 XL |
| 5,706,915 A | | 1/1998 | Shimazu et al. |
| 6,116,387 A | | 9/2000 | Kao et al. |
| 6,119,820 A | | 9/2000 | Steptoe et al. |
| 6,241,053 B1 | | 6/2001 | Tahara et al. |
| 6,367,598 B1 | * | 4/2002 | Sporzynski ............. 188/218 XL |
| 6,405,839 B1 | | 6/2002 | Ballinger et al. |
| 6,454,058 B1 | * | 9/2002 | Ballinger et al. ....... 188/218 XL |
| 6,655,508 B2 | * | 12/2003 | Ballinger et al. ......... 188/218 A |
| 7,066,306 B2 | * | 6/2006 | Gavin ..................... 188/218 XL |

FOREIGN PATENT DOCUMENTS

| | | |
|---|---|---|
| GB | 2128694 | 5/1984 |
| JP | 59194139 | 11/1984 |

* cited by examiner

*Primary Examiner* — Bradley King
(74) *Attorney, Agent, or Firm* — Kenealy Vaidya LLP; Mark E. Duell

(57) ABSTRACT

A vehicle brake disk is disclosed that can include an outer friction member having a first thickness in cross-section, and an inner friction member having a second thickness in cross-section that is thicker than the first thickness in cross-section of the outer friction member. A plurality of vanes can connect the outer friction member to the inner friction member, and a connection cylinder portion can connect the outer friction member to a hub member for connection to a wheel of the vehicle. The vanes can be configured to have different lengths. The vanes can alternate in length about the periphery of the brake disk, with a uniform location of the end portions at an outer periphery of the brake disk and alternating locations of other end portions at an inner periphery of the brake disk.

8 Claims, 2 Drawing Sheets

VENTILATED BRAKE DISK AND METHOD

BACKGROUND

1. Field

The disclosed subject matter relates to a vehicle brake disk and a method of manufacturing the same. More specifically, the disclosed subject matter relates to a ventilated brake disk that has variable thickness friction plates and variable vane length and location.

2. Brief Description of the Related Art

Conventional vehicle disk brake rotors are arranged to rotate with a wheel hub of the vehicle. The rotor includes two oppositely-facing annular friction surfaces which, during operation of the brake, are engaged by two blocks of friction material (e.g., brake pads) which are moved (usually by hydraulic or pneumatic devices) towards one another into contact with the two friction surfaces so that frictional forces occur and slow the rotation of the rotor, and hence slow the wheel of the vehicle.

In order to reduce temperature/heat accumulation in disk brake rotors that is caused by the frictional forces, conventional rotors include a first generally annular friction portion which provides one of the annular friction surfaces, and a second generally annular friction portion which provides the other of the annular friction surfaces. The first and second friction portions are conventionally of constant thickness so that they have substantially equal thermal capacity at all points thereof. The friction portions are also arranged in spaced parallel relationship. These friction portions are joined by vanes between which are cooling ducts extending radially and outwardly of the rotor. The cooling ducts are arranged so that, as the rotor is rotated, air passes through the ducts and acts to cool the friction portions. Air inlets to the ducts are provided at an inner edge of the first and second friction portions so that the rotor functions as a centrifugal fan driving air outwardly to outlets at the outer edges of the friction portions.

The most common type of disk brake rotor used on vehicles has first and second friction portions, as described above, and includes an annular mounting portion configured to engage the wheel hub of the vehicle. The rotor includes a generally cylindrical connecting portion which extends axially and joins the annular mounting portion to the first friction portion. The first friction portion is displaced axially relative to the mounting portion and is supported by the connecting portion. The second friction portion is supported by the above-described vanes and is offset from the first friction portion.

Most rotors of the above-described general construction have their first friction portion nearer to the mounting portion than their second friction portion. Thus, there is free access for the cooling air to flow between the inner edges of the first and second friction portions. However, this design is subject to the problem known as "coning". Coning occurs when the friction portions become hot and expand while the connecting portion, which is not so hot, expands less. Thus, the connecting portion is pulled into a slightly conical form by the first friction portion. Expansion of the second friction portion can enhance this effect. This results in the friction portions bending out of their initial planes. This bending causes points of concentration of pressure to occur during braking at certain locations of the friction portion, which generates heat at these locations. These higher heat locations have to absorb greater amounts of heat than other portions of the friction portions. This causes temperature differentials which affect the performance of the brake and also affect the wear of the rotor and the brake pads. The temperature and pressure differentials can also result in cracking or other deterioration of the rotor.

High heat loads that occur in a brake disk while bringing a vehicle to a stop can also cause brake disk deformation, stress, and cracking due to the in appropriate thermal expansion of the disk. For example, brake disk deformation due to heat load can cause uneven brake pad wear, and uneven brake pad wear can reduce a brake's general effectiveness. Moreover, as taper wear increases, the vehicle stopping distance will increase for the same pedal input stroke. Uneven brake pad wear also causes higher brake drag, which results in lower fuel efficiency and higher brake judder. Thus, there has been a long felt need in the art to achieve solutions to the above-described and other problems in the field of vehicle brakes.

SUMMARY

The disclosed subject matter relates to a vehicle brake disk and a method of manufacturing a brake disk.

In accordance with an aspect of the disclosed subject matter, a vehicle brake disk for attachment to a wheel of a vehicle can include an outer friction member having a first thickness in cross-section and configured to face away from the vehicle when attached to the wheel of the vehicle. An inner friction member can be provided having a second thickness in cross-section that is thicker than the first thickness in cross-section of the outer friction member along substantially an entire radial length of the inner friction member. The inner friction member is configured to face towards the vehicle when attached to the wheel of the vehicle. A plurality of vanes can be provided to connect the outer friction member to the inner friction member. A connection cylinder portion can be configured to extend from the outer friction member. A hub member can extend from the connection cylinder portion and be configured for connection to the wheel of the vehicle. The first thickness in cross-section is measured in a direction parallel with a direction extending perpendicularly away from the wheel of the vehicle when the disk is attached to the vehicle, and the second thickness in cross-section is measured in a direction parallel with a direction extending perpendicularly away from the wheel of the vehicle when the disk is attached to the vehicle.

In accordance with another aspect of the disclosed subject matter the connection cylinder portion can be integrally formed with the outer friction member, and the outer friction member can be located between the connection cylinder portion and the inner friction member.

In accordance with another aspect of the disclosed subject matter the plurality of vanes can include a first set of vanes each having a first predetermined length and a second set of vanes each having a second predetermined length, the first predetermined length being different from the second predetermined length.

In accordance with yet another aspect of the disclosed subject matter the first set of vanes each extend along a respective longitudinal axis bound by a first end and a second end. The first end of each of the first set of vanes is located at a first predetermined radial distance from a center of the brake disk. The second set of vanes each extend along a respective longitudinal axis bound by a first end and a second end, and the first end of each of the second set of vanes is located at a second predetermined radial distance from the center of the brake disk. The first predetermined radial distance from the center of the brake disk can be different from the second predetermined radial distance from the center of the brake disk.

In accordance with still another aspect of the disclosed subject matter, the second end of each of the first set of vanes is located at a third predetermined radial distance from the center of the brake disk, and the second end of each of the second set of vanes is located at the third predetermined radial distance from the center of the brake disk.

In accordance with another aspect of the disclosed subject matter, the first set of vanes each extend along a respective longitudinal axis bound by a first end and a second end. The second end of each of the first set of vanes can be located at a third predetermined radial distance from the center of the brake disk. The second set of vanes each extend along a respective longitudinal axis bound by a first end and a second end. The second end of each of the second set of vanes can be located at the third predetermined radial distance from the center of the brake disk.

In accordance with another aspect of the disclosed subject matter, an extension portion can be located between the outer friction member and the connection cylinder portion.

In accordance with another aspect of the disclosed subject matter, the plurality of vanes can each have a vane thickness in cross-section that is greater than the first thickness in cross-section of the outer friction member. The vane thickness in cross-section can be measured in a direction that is parallel to the direction in which the first thickness in cross-section is measured.

In accordance with still another aspect of the disclosed subject matter, the plurality of vanes can each have a vane thickness in cross-section that is greater than the second thickness in cross-section of the inner friction member. The vane thickness in cross-section can be measured in a direction that is parallel to the direction in which the second thickness in cross-section is measured.

In accordance with another aspect of the disclosed subject matter, a vehicle brake disk for attachment to a wheel of a vehicle can include an outer friction member having a first thickness in cross-section and configured to face away from the vehicle when attached to the wheel of the vehicle and an inner friction member having a second thickness in cross-section that is thicker than the first thickness in cross-section of the outer friction member. The inner friction member can be configured to face towards the vehicle when attached to the wheel of the vehicle. A plurality of vanes can be provided to connect the outer friction member to the inner friction member. The plurality of vanes can include a first set of vanes each having a first predetermined length and a second set of vanes each having a second predetermined length, the first predetermined length being different from the second predetermined length. A connection cylinder portion can extend from at least one of the outer friction member and the inner friction member, and a hub member can extend from the connection cylinder and be configured for connection to the wheel of the vehicle. The first thickness in cross-section can be measured in a direction parallel with a direction extending perpendicularly away from the wheel of the vehicle when the disk is attached to the vehicle, and the second thickness in cross-section can be measured in a direction parallel with the direction extending perpendicularly away from the wheel of the vehicle when the disk is attached to the vehicle.

In accordance with yet another aspect of the disclosed subject matter, the connection cylinder portion can be integrally formed with the outer friction member, and the outer friction member can be located between the connection cylinder portion and the inner friction member.

In accordance with still another aspect of the disclosed subject matter, each vane of the first set of vanes can extend along a longitudinal axis bound by a first end and a second end. The first end of each vane of the first set of vanes can be located at a first predetermined radial distance from a center of the brake disk, and each vane of the second set of vanes can extend along a longitudinal axis bound by a first end and a second end. The first end of each vane of the second set of vanes can be located at a second predetermined radial distance from the center of the brake disk, the first predetermined radial distance from the center of the brake disk being different from the second predetermined radial distance from the center of the brake disk.

In accordance with another aspect of the disclosed subject matter, the second end of each vane of the first set of vanes can be located at a third predetermined radial distance from the center of the brake disk, and the second end of each vane of the second set of vanes can be located at the third predetermined radial distance from the center of the brake disk.

In accordance with another aspect of the disclosed subject matter, each vane of the first set of vanes extends along a longitudinal axis bound by a first end and a second end. The second end of each vane of the first set of vanes can be located at a third predetermined radial distance from the center of the brake disk, and each vane of the second set of vanes can extend along a longitudinal axis bound by a first end and a second end. The second end of each vane of the second set of vanes can be located at the third predetermined radial distance from the center of the brake disk.

In accordance with another aspect of the disclosed subject matter, an extension portion can be located between the outer friction member and the connection cylinder portion.

In accordance with yet another aspect of the disclosed subject matter, the plurality of vanes can each have a vane thickness in cross-section that is greater than the first thickness in cross-section of the outer friction member. The vane thickness in cross-section can be measured in a direction that is parallel to the direction in which the first thickness in cross-section is measured.

In accordance with another aspect of the disclosed subject matter, a vehicle brake disk for attachment to a wheel of a vehicle can include an outer friction member and an inner friction member located adjacent the outer friction member. A plurality of vanes can connect the outer friction member to the inner friction member. The plurality of vanes can include a first set of vanes, each vane of the first set of vanes having a first predetermined length, and a second set of vanes, each vane of the second set of vanes having a second predetermined length. The first predetermined length can be different from the second predetermined length. Each vane of the plurality of vanes extends along a respective longitudinal axis and along a radial direction that extends from a center of the brake disk, and each vane of the plurality of vanes is bound by a first end and a second end. Each of the second ends of the plurality of vanes is located at a same predetermined radial distance from a center of the brake disk, and each of the first ends of the vanes of the first set of vanes is located at a first predetermined radial distance from the center of the brake disk. Each of the first ends of the vanes of the second set of vanes is located at a second predetermined radial distance from the center of the brake disk. The second predetermined radial distance can be different from the first predetermined radial distance from the center of the brake disk. A connection cylinder portion can extend from at least one of the outer friction member and the inner friction member. A hub member can extend from the connection cylinder portion and be configured for connection to the wheel of the vehicle.

In accordance with yet another aspect of the disclosed subject matter, the connection cylinder portion can be integrally formed with the outer friction member, and the outer friction member can be located between the connection cylinder portion and the inner friction member.

In accordance with still another aspect of the disclosed subject matter, the first set of vanes and second set of vanes can be located in alternating fashion with respect to each other about a periphery of the vehicle disk.

In accordance with yet another aspect of the disclosed subject matter, the outer friction member has a first thickness in cross-section and is configured to face away from the vehicle when attached to the wheel of the vehicle, and the inner friction member has a second thickness in cross-section that is thicker than the first thickness in cross-section of the outer friction member. The inner friction member can be configured to face towards the vehicle when attached to the wheel of the vehicle. The first thickness in cross-section is measured in a direction parallel with a direction extending perpendicularly away from the wheel of the vehicle when the disk is attached to the wheel of the vehicle, and the second thickness in cross-section is measured in the direction parallel with a direction extending perpendicularly away from the wheel of the vehicle when the disk is attached to the wheel of the vehicle.

Still other features and characteristics of the disclosed subject matter will become apparent to those skilled in the art from a reading of the following detailed description of exemplary embodiments constructed in accordance therewith, and taken in conjunction with the accompanying drawings.

BRIEF DESCRIPTION OF THE DRAWINGS

The disclosed subject matter will become clear from the following description with reference to the accompanying drawings, wherein.

DETAILED DESCRIPTION OF EXEMPLARY EMBODIMENTS

The disclosed subject matter will now be described in more detail with reference to exemplary embodiments of the vehicle brake disk and method, given only by way of example, and with reference to the accompanying drawings.

The disclosed subject matter relates to a vehicle brake disk and method of manufacture, and more particularly to a vehicle brake disk that has varying plate thickness and varying vane length and shape characteristics. In addition, the disclosed subject matter relates to a method for making vehicle brake disks having the above-described characteristics.

Figure 1:
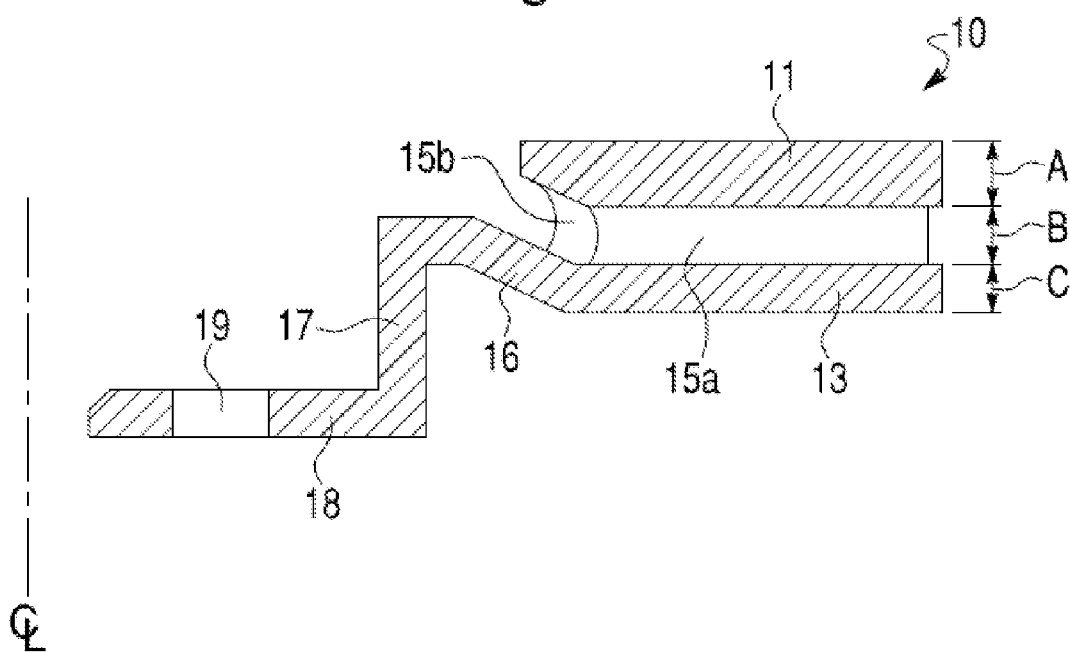
FIG. 1 is a partial side cross-sectional view taken along line I-I in FIG. 2 of an embodiment of a vehicle brake disk made in accordance with principles of the disclosed subject matter.

FIG. 1 shows a partial cross section of a vehicle brake disk 10 that includes an inner friction member 11 connected to an outer friction member 13 by a set of first vanes 15a and second vanes 15b. The outer friction member 13 is connected to a hub connection member 18 of the disk 10 via an intermediate cylinder portion 17 and extension portion 16. The extension portion 16 can extend from the intermediate cylinder portion 17 at an oblique angle. Through holes 19 are located in the hub connection member 18 for allowing a plurality of lug bolts to pass therethrough for attachment to a wheel of the vehicle. The thickness of inner friction member 11 is shown as a distance "A". The thickness of vanes 15a and 15b is shown as distance "B". The thickness of the outer friction member 13 is shown as distance "C". According to this particular embodiment of the disclosed subject matter, the thickness "A" of inner friction member 11 is greater than the thickness "C" of the outer friction member 13. In addition, the thickness "B" of vanes 15a and 15b is greater than either the thickness "A" of inner friction member 11 or the thickness "C" of the outer friction member 13. For example, the inner friction member 11 can be 9.5 mm thick, the outer friction member 13 can be 8.5 mm thick, and the vanes 15a and 15b can be 10 mm thick.

Figure 2:
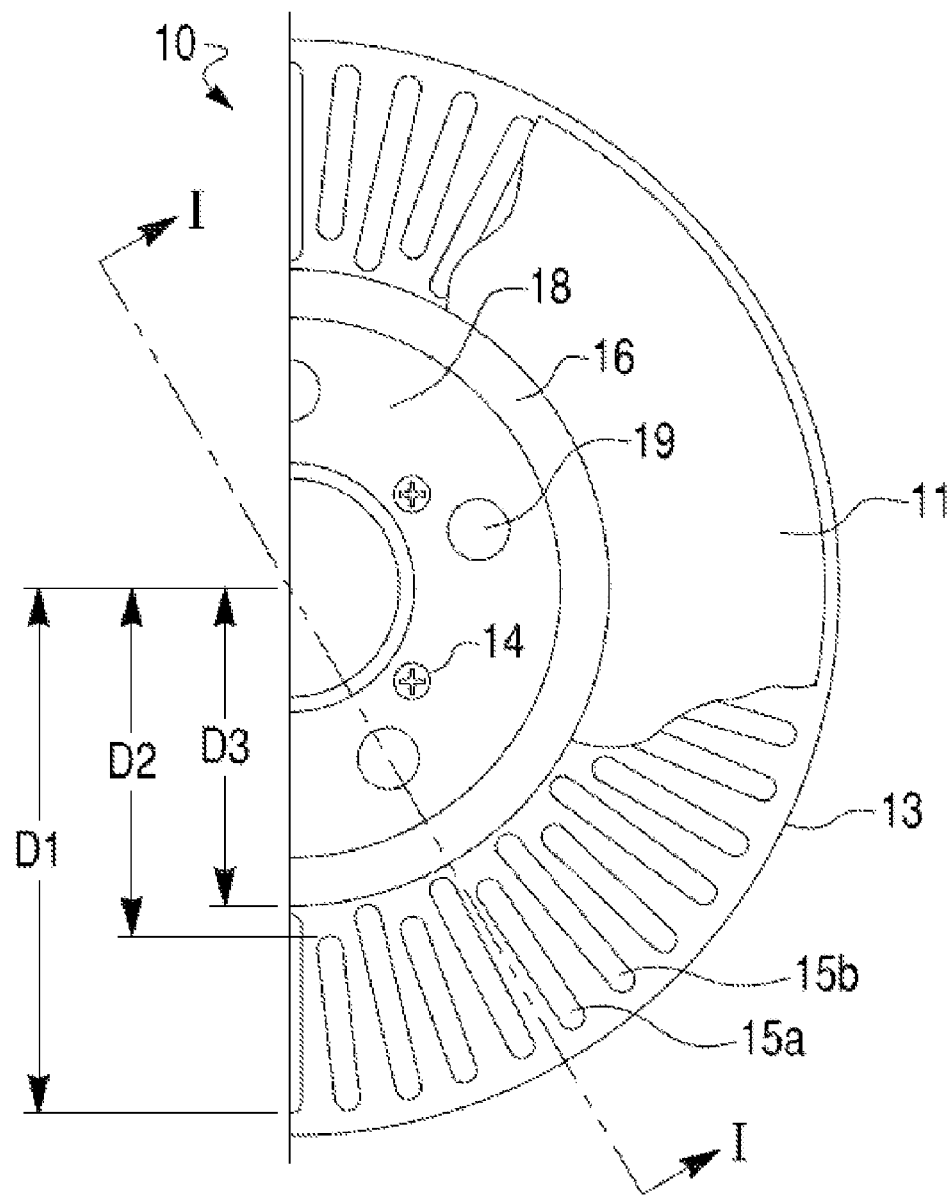
FIG. 2 is a partial front cross sectional view of the vehicle brake disk as shown in FIG. 1.

FIG. 2 is a partial cross-sectional front view of the brake disk 10 of FIG. 1. As can be seen in this view, the vanes 15a can be different in size as compared to vanes 15b. In particular, vanes 15a can be shorter and extend from a position that is further from a center of the disk 10 than the longer vanes 15b. For example, the first set of vanes 15a can be 0.5 mm thick and 109 mm long while the second set of vanes 15b can be 0.5 mm thick and 122 mm long. In addition, the vanes 15b can extend radially from a center of the disk 10 starting at a location that is 202 mm from the center of the disk 10, while the vanes 15a can extend radially from the center of the disk 10 starting at a location that is 215 mm from the center of the disk 10. Each of the sets of vanes 15a and 15b can extend to a termination location that is 324 mm from the center of the disk 10. In the above-described exemplary specific embodiment there are forty eight (48) equally spaced alternating vanes 15a and 15b spaced about the disk 10, with each vane extending in radial fashion away from the center of the disk 10.

The brake disk 10 can be made from an integral single piece of material, such as a metal, a ceramic, a plastic, etc. For example, the disk 10 can be formed from a cast iron member and can be specifically formed as a ventilated vehicle brake disk that includes a plurality of channels formed between vanes 15a and 15b. The channels permit air flow between the inner friction member 11 and outer friction member 13 to cool the brake disk 10 during operation. In addition, the channels can be configured to accelerate or concentrate air flow between the inner friction member 11 and outer friction member 13 to cool the brake disk 10 during operation.

The specific configuration described above can result in a brake disk that has reduced disk deformation during or after use by providing more uniform heat distribution, etc. The configuration can also prevent cracking of the disk when the disk is operated at high temperatures, i.e., when the disk is used in high temperature conditions or in continuous braking conditions.

While there has been described what are at present considered to be exemplary embodiments of the invention, it will be understood that various modifications may be made thereto. For example, the specific thickness of the inner friction member 11, outer friction member 13 and vanes 15a, 15b can be altered without departing from the spirit and scope of the invention. In particular, the thickness of inner friction member 11 can be different than 9.5 mm, and can be thicker than the vanes 15a, 15b. In addition, the thickness of outer friction member 13 can be different than 8.5 mm and can also be thicker than the vanes 15a, 15b. The thickness can refer to the average thickness of each of the members 11, 13 and/or vanes 15a 15b taken along their respective length. Alternatively, the thickness can refer to a maximum thickness of each of the members 11, 13 and/or vanes 15a 15b. Although the side cross section of the disk 10 shows a rather uniform plate-like structure for the inner friction member 11 and outer friction member 13 and vanes 15a, 15b, a certain amount of variation in the cross-sectional shape of these structures is contemplated. For example, the members 11, 13, and vanes 15a, 15b can be constructed such that during rotation of the disk 10 air is better directed or accelerated through the disk 10. Specifically, if a higher amount of cooling is desired at a middle portion of the disk 10, a plurality of structural irregularities could be provided in one or all of the members 11, 13, and vanes 15a, 15b to create turbulence in the air flow therethrough to effect greater cooling. Alternatively, the cross-sectional thickness of any of these structures can vary along its radial extension length to concentrate materials and change the heat transfer and conduction characteristics of the brake disk 10.

The embodiment of the disk 10 described above includes alternating short and long vanes 15a and 15b that all extend to a same radial extent at the outer perimeter of the disk 10. However, the location of the vanes 15a and 15b can vary such that the vanes 15a and 15b extend to different radial locations, respectively, about the outer perimeter of the disk 10 while being located at a same radial location about an inner periphery of the disk 10. In other words, the outer portion of the vanes 15a and 15b can alternatingly extend shorter and longer at their outermost extent, while the innermost portions of the vanes 15a and 15b are all located on a same radial location at a particular circumference from the center of the disk 10. Furthermore, it is not necessary that the different shaped vanes 15a and 15b alternate with each other. A shorter vane 15a can be located between three, four or more longer vanes 15b and vice versa. In addition, the short vanes 15a and long vanes 15b can be offset from each other and not have any common termination location with respect to a radial distance from the center of the disk 10. Although the vanes are shown as being symmetrical and extending uniformly in the attached figures, the specific cross sectional shapes of the vanes 15a and 15b can change without departing from the spirit and scope of the invention. As indicated above, the vanes 15a and 15b can be configured to accelerate or decelerate air flow through the disk 10 and/or the vanes 15a and 15b can be shaped to concentrate material, and therefore heat sink capacity, at certain location(s) about the disk 10. Thus, there may be some changes in shape along the length of the vanes to provide different heating, cooling, overall wear, or braking characteristics of the brake disk and associated brake components.

The method for manufacturing a brake disk that includes the various structures and characteristics can include providing a mold that is shaped to provide a first friction member that is thicker than a second friction member and a plurality of vanes connecting the first and second friction members. The vanes can be configured to have alternating lengths that end at a same location spaced from the center of the brake disk while starting at varying positions from a vane end point at a position closer to the center of the brake disk. Molten iron can be poured into the mold to form a rough blank of the brake disk. Afterwards, the molded brake disk can be machined such that the outwardly facing surfaces of the first and second friction members form substantially flat and parallel planes with respect to each other. Sandblasting, acid etching, and other known methods can be used to finish any of the surfaces, including the interior channels formed by the adjacent vanes.

While there has been described what are at present considered to be exemplary embodiments of the invention, it will be understood that various modifications may be made thereto, and it is intended that the appended claims cover such modifications as fall within the true spirit and scope of the invention. Any conventional art document referenced above is/are hereby incorporated by reference in its entirety.

What is claimed is:

1. A vehicle brake disk for attachment to a wheel of a vehicle, comprising:
    an outer friction member having a first thickness in cross-section and configured to face away from the vehicle when attached to the wheel of the vehicle;
    an inner friction member having a second thickness in cross-section that is thicker than the first thickness in cross-section of the outer friction member along substantially an entire radial length of the inner friction member, the inner friction member configured to face towards the vehicle when attached to the wheel of the vehicle;
    a plurality of vanes connecting the outer friction member to the inner friction member;
    a connection cylinder portion extending from the outer friction member; and
    a hub member extending from the connection cylinder portion and configured for connection to the wheel of the vehicle, wherein
    the first thickness in cross-section is measured in a direction parallel with a direction extending perpendicularly away from the wheel of the vehicle when the disk is attached to the vehicle, the first thickness in cross-section is substantially uniform in the radial direction and the first thickness is substantially uniform in a circumferential direction along a substantial, continuous portion, and the second thickness in cross-section is measured in a direction parallel with a direction extending perpendicularly away from the wheel of the vehicle when the disk is attached to the vehicle, the second thickness in cross-section is substantially uniform in the radial direction and the second thickness is substantially uniform in a circumferential direction along a substantial, continuous portion, wherein
    the connection cylinder portion is integrally formed with the outer friction member, and the outer friction member is located between the connection cylinder portion and the inner friction member.

2. The vehicle brake disk of claim 1, wherein the plurality of vanes includes a first set of vanes that each has a first predetermined length and a second set of vanes that each has a second predetermined length, the first predetermined length being different from the second predetermined length.

3. The vehicle brake disk of claim 2, wherein the first set of vanes each extend along a respective longitudinal axis bound by a first end and a second end, the first end of each of the first set of vanes is located at a first predetermined radial distance from a center of the brake disk, and the second set of vanes each extend along a respective longitudinal axis bound by a first end and a second end, the first end of each of the second set of vanes is located at a second predetermined radial distance from the center of the brake disk, the first predetermined radial distance from the center of the brake disk being different from the second predetermined radial distance from the center of the brake disk.

4. The vehicle brake disk of claim 3, wherein the second end of each of the first set of vanes is located at a third predetermined radial distance from the center of the brake disk, and the second end of each of the second set of vanes is located at the third predetermined radial distance from the center of the brake disk.

5. The vehicle brake disk of claim 2, wherein the first set of vanes each extend along a respective longitudinal axis bound by a first end and a second end, the second end of each of the first set of vanes is located at a third predetermined radial distance from the center of the brake disk, and the second set of vanes each extend along a respective longitudinal axis bound by a first end and a second end, the second end of each of the second set of vanes is located at the third predetermined radial distance from the center of the brake disk.

6. The vehicle brake disk of claim 1, further comprising an extension portion located between the outer friction member and the connection cylinder portion.

7. The vehicle brake disk of claim 1, wherein the plurality of vanes each have a vane thickness in cross-section that is greater than the first thickness in cross-section of the outer friction member, and the vane thickness in cross-section is measured in a direction that is parallel to the direction in which the first thickness in cross-section is measured.

8. The vehicle brake disk of claim 1, wherein the plurality of vanes each have a vane thickness in cross-section that is greater than the second thickness in cross-section of the inner friction member, and the vane thickness in cross-section is measured in a direction that is parallel to the direction in which the second thickness in cross-section is measured.

* * * * *